US012390052B2

(12) United States Patent
Nothum, Jr. et al.

(10) Patent No.: US 12,390,052 B2
(45) Date of Patent: Aug. 19, 2025

(54) AUTOMATIC OR MECHANIZED FOOD-PROCESS LINES

(71) Applicant: Ryan D. Nothum, Springfield, MO (US)

(72) Inventors: Robert G. Nothum, Jr., Willard, MO (US); Ryan D. Nothum, Springfield, MO (US)

( * ) Notice: Subject to any disclaimer, the term of this patent is extended or adjusted under 35 U.S.C. 154(b) by 742 days.

(21) Appl. No.: 17/739,560

(22) Filed: May 9, 2022

(65) Prior Publication Data

US 2022/0354312 A1 Nov. 10, 2022

Related U.S. Application Data

(60) Provisional application No. 63/186,080, filed on May 8, 2021.

(51) Int. Cl.
*A47J 44/00* (2006.01)
*A23P 20/12* (2016.01)
*A23P 20/15* (2016.01)

(52) U.S. Cl.
CPC ............... *A47J 44/00* (2013.01); *A23P 20/12* (2016.08); *A23P 20/15* (2016.08)

(58) Field of Classification Search
CPC ............ A47J 44/00; A23P 20/12; A23P 20/15
USPC ........................................ 99/325, 483, 535
See application file for complete search history.

(56) References Cited

U.S. PATENT DOCUMENTS

2018/0282068 A1* 10/2018 Nothum, Jr. ......... B65G 41/005
2021/0205835 A1   7/2021 Nothum, Jr.

* cited by examiner

*Primary Examiner* — Phuong T Nguyen
(74) *Attorney, Agent, or Firm* — Jonathan A. Bay

(57) ABSTRACT

An improvement for automatic/mechanized food-process lines pertains to racking provisions for assembling, disassembling and re-assembling numerous separate machines that form to make up the line. That is, one machine can be swapped out for a different machine in order to cause a change in the output food product pieces. For example, a swapped in machine may give a different coating to the food product pieces (eg., breading vs. Panko) or run food product pieces of substantially different character (eg., whole muscle pieces like chicken tenders vs. formed product like hamburger patties). The improvement has a track attached or affixed to either a low elevation mounting structure of a given food process line machine or the factory floor, but not the other, and a router member attached or affixed to the other of the low elevation mounting structure or the factory floor, for following the track.

20 Claims, 13 Drawing Sheets

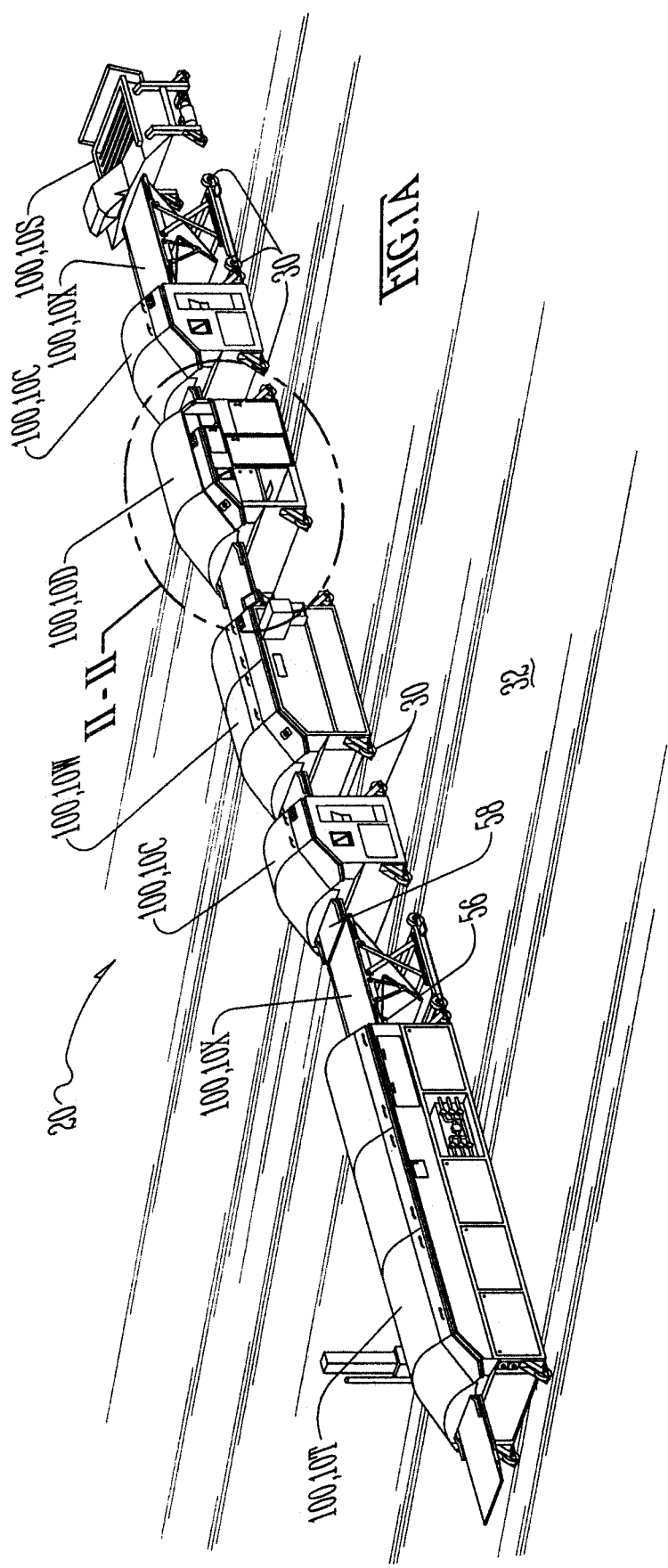

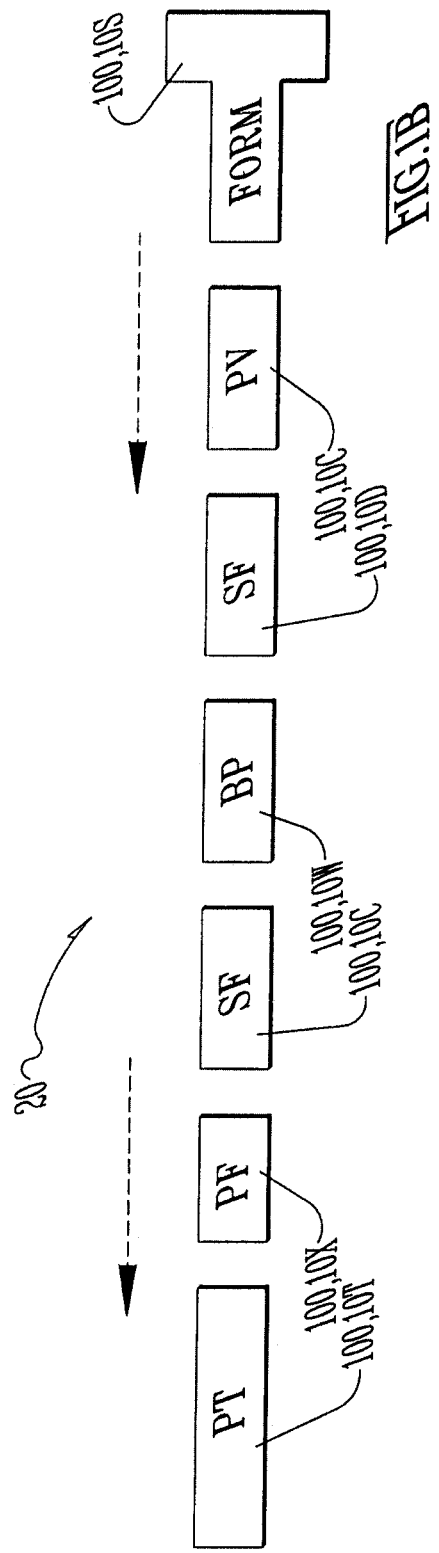

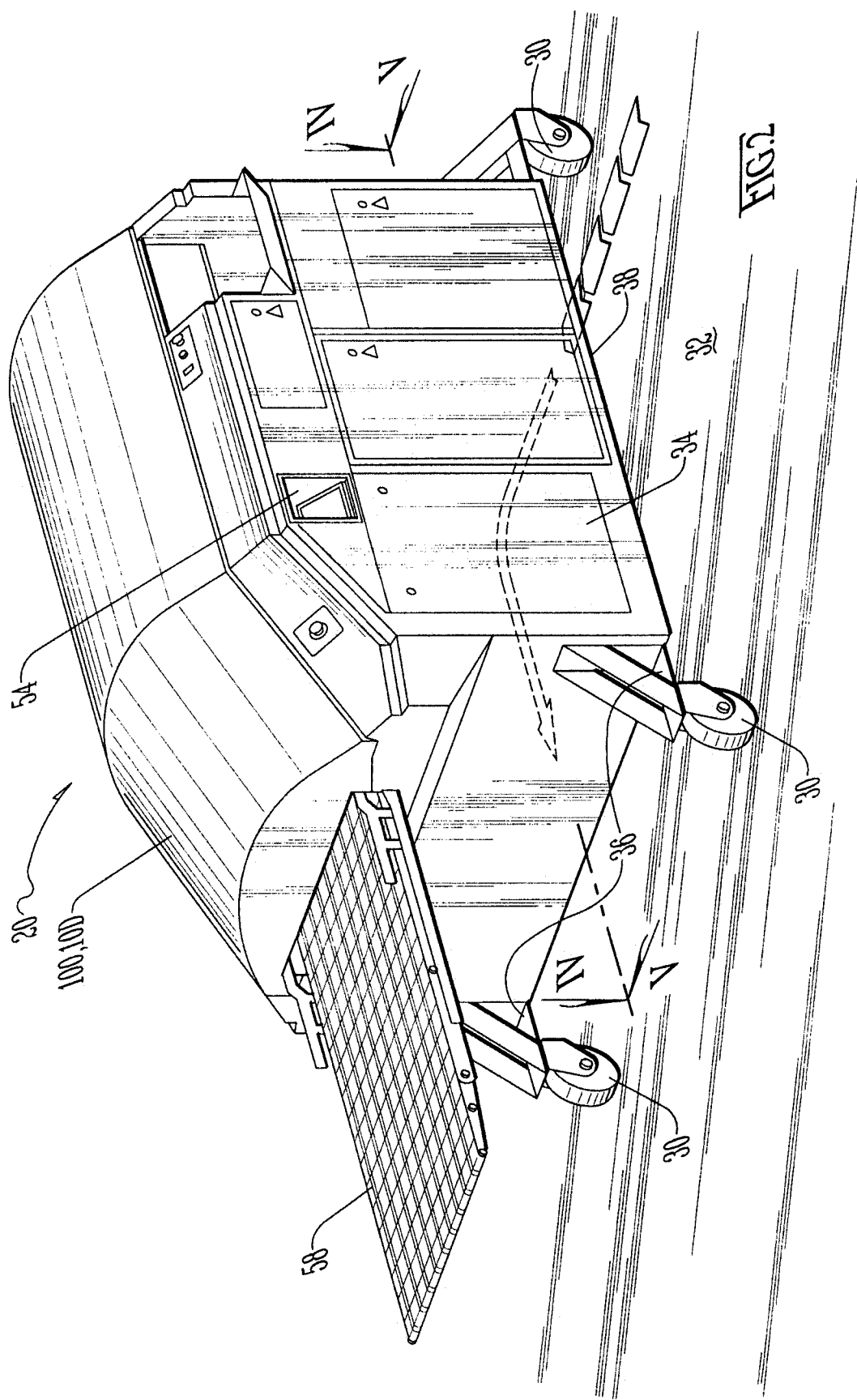

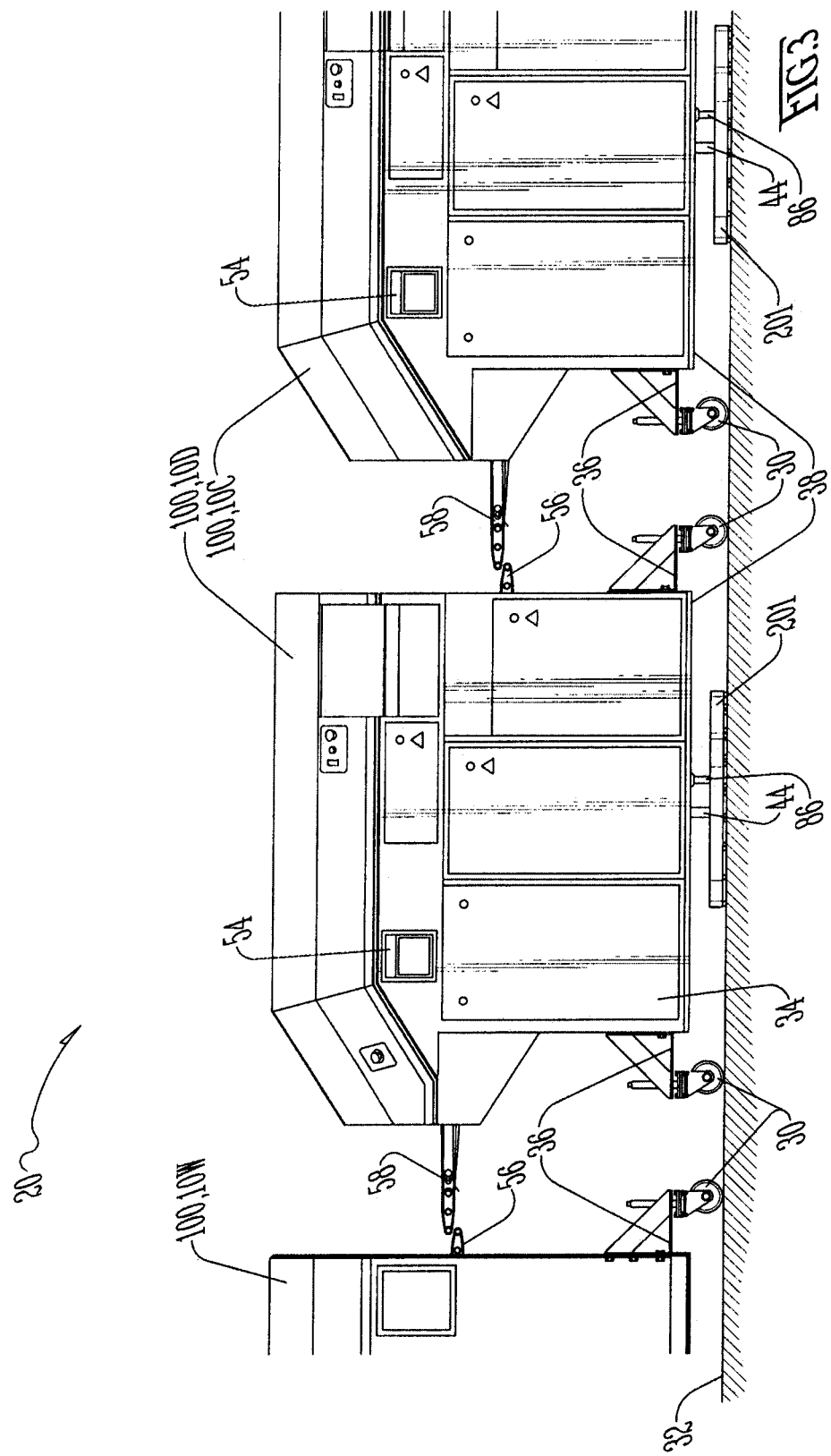

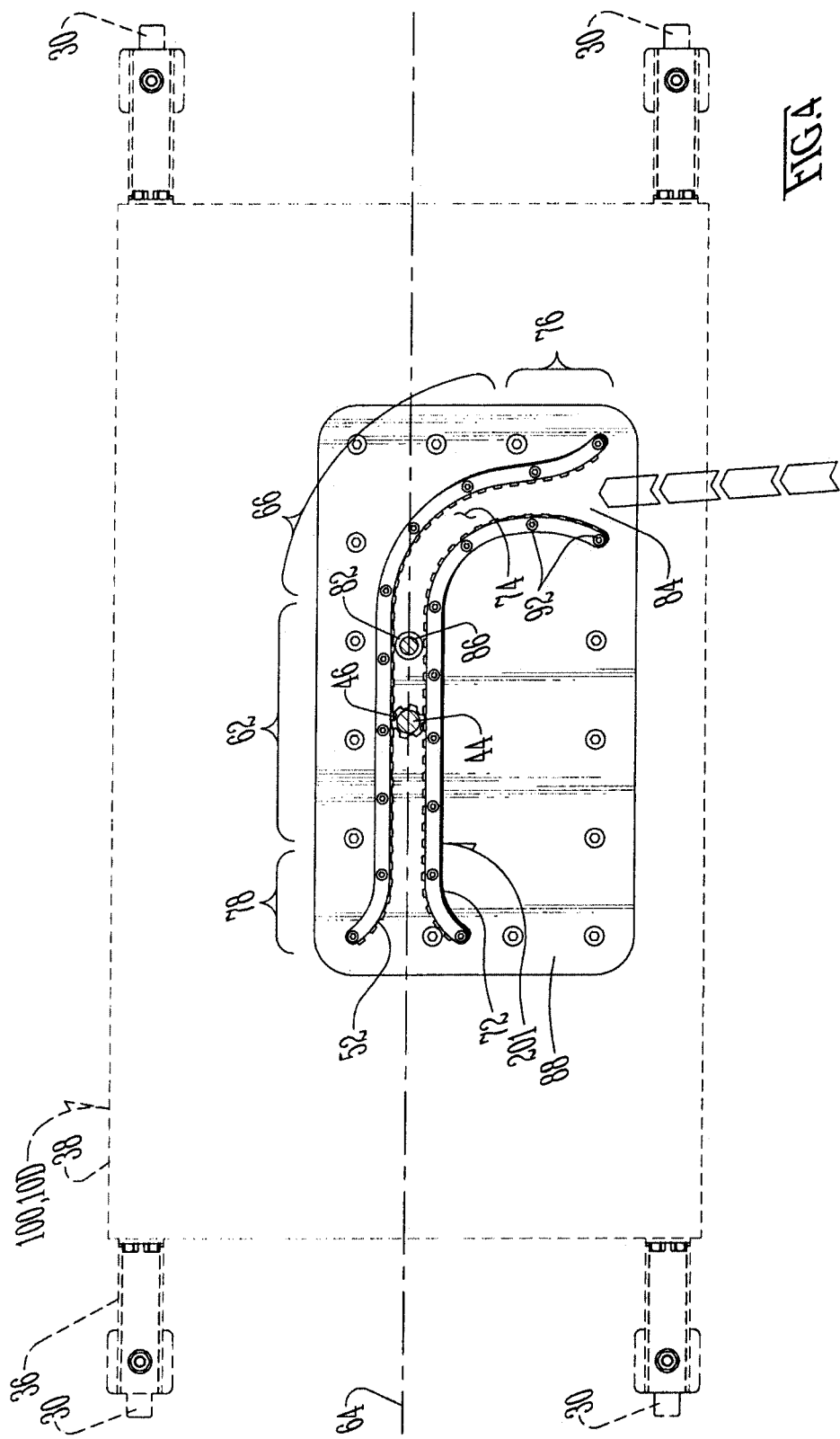

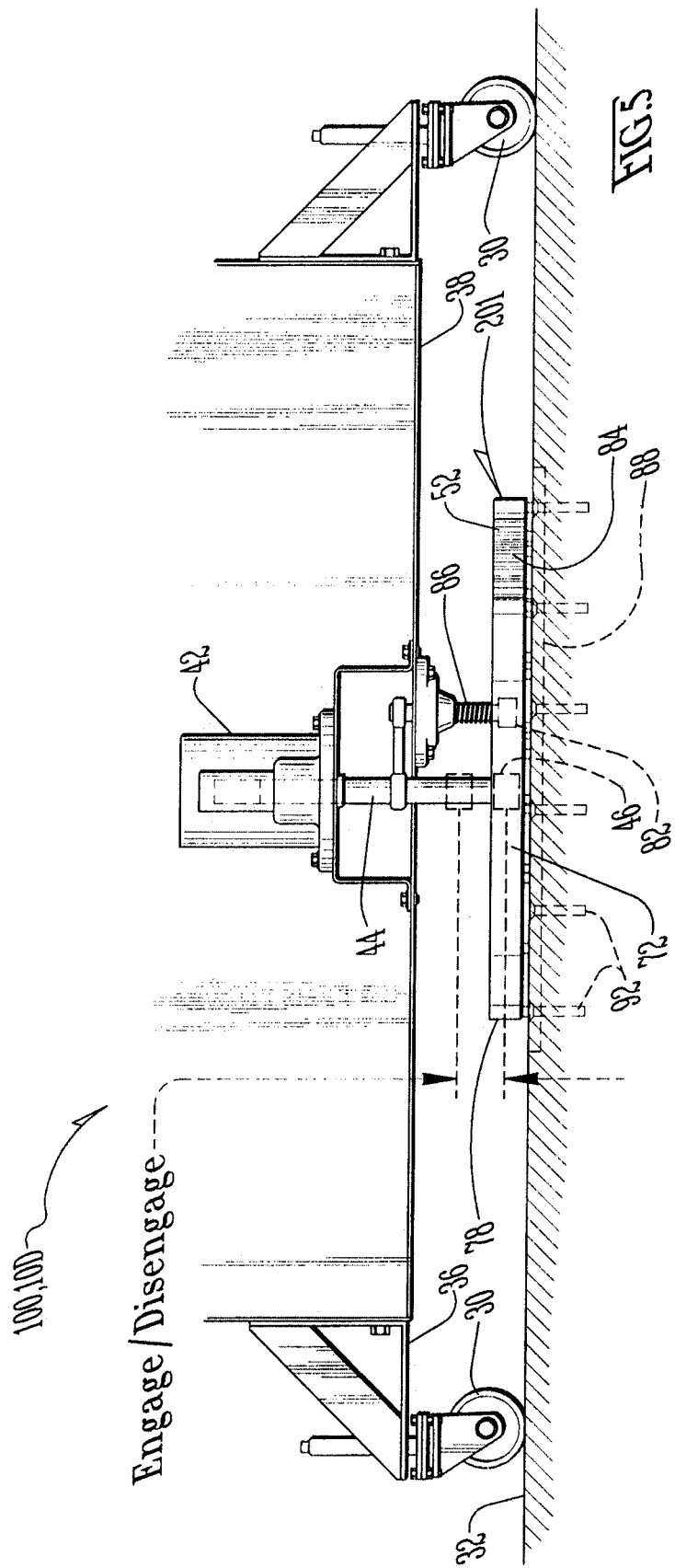

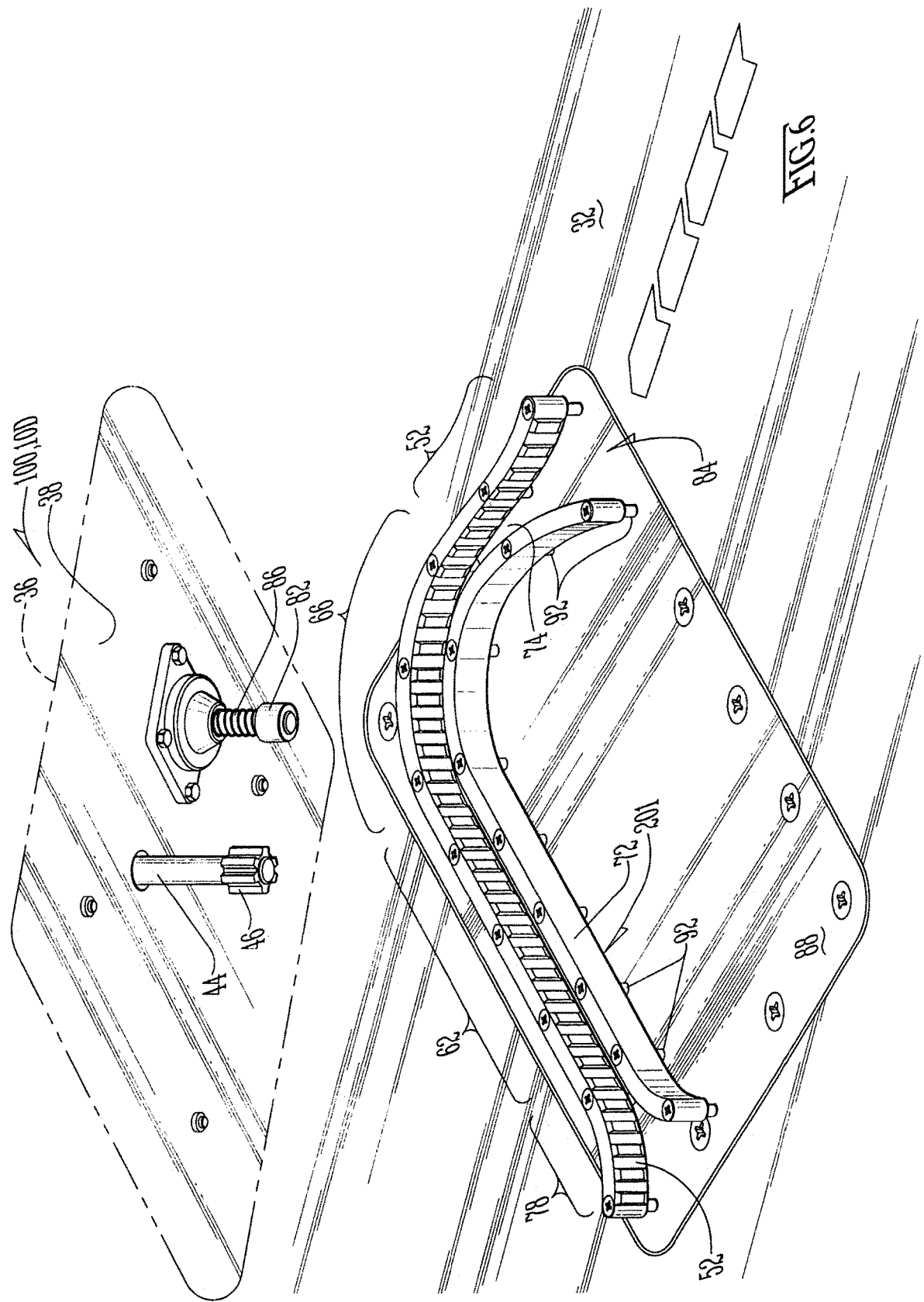

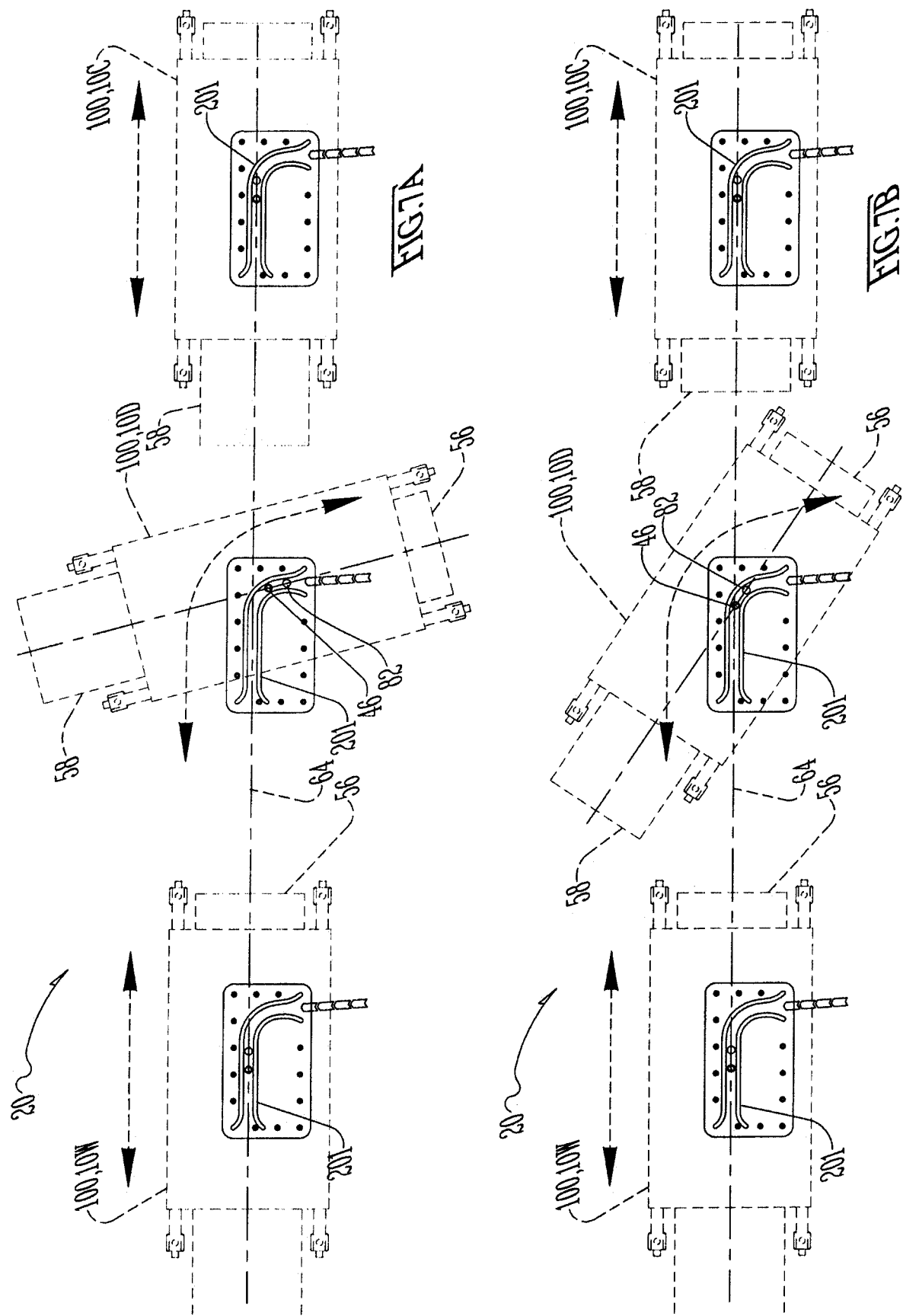

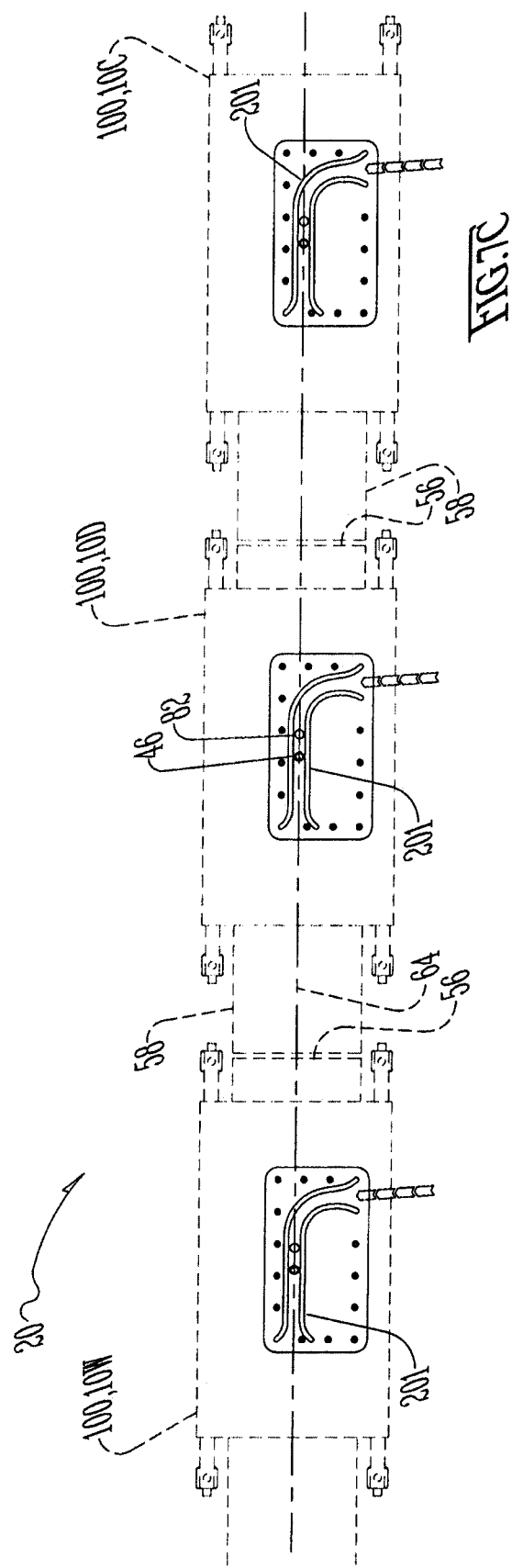

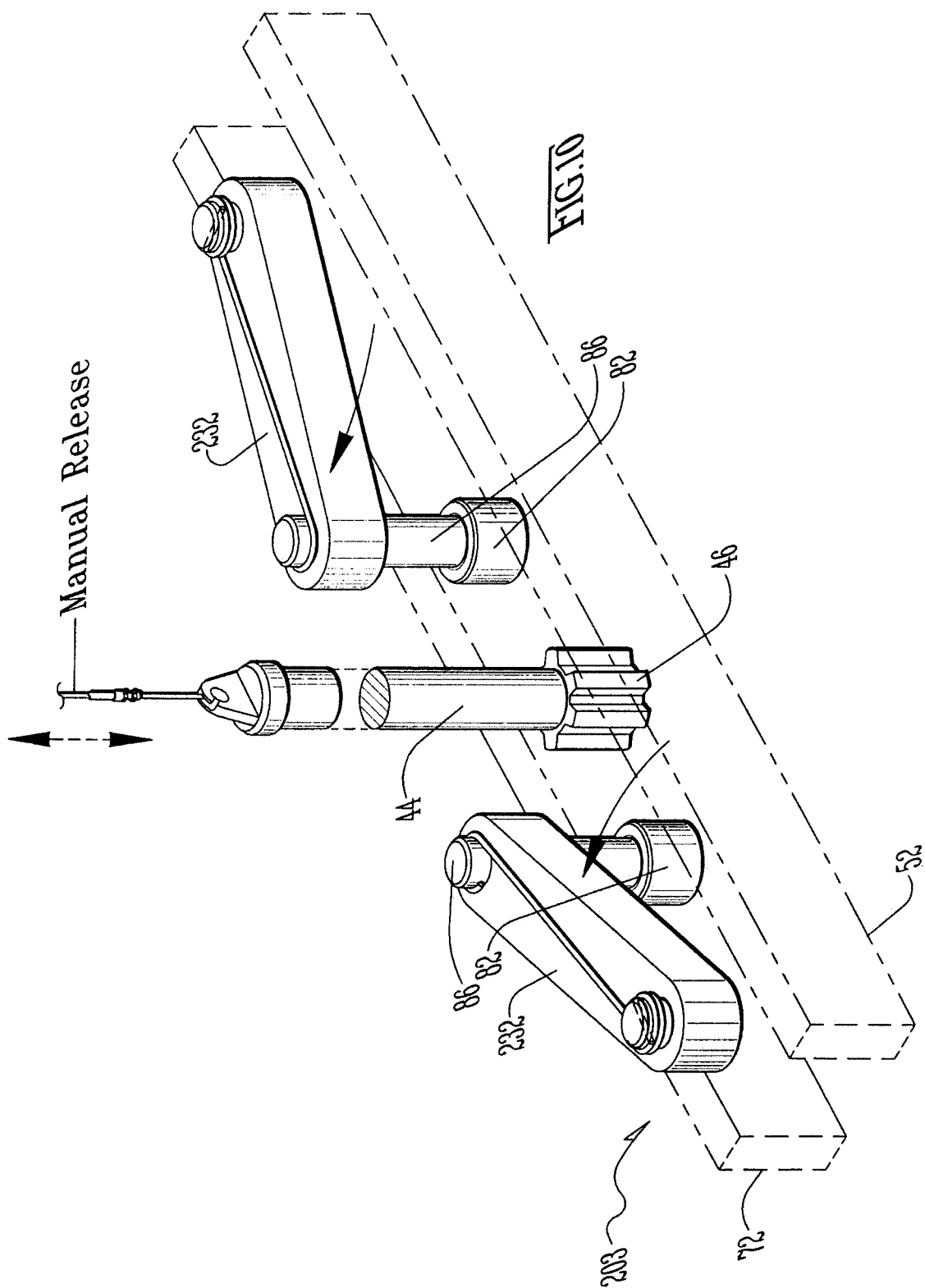

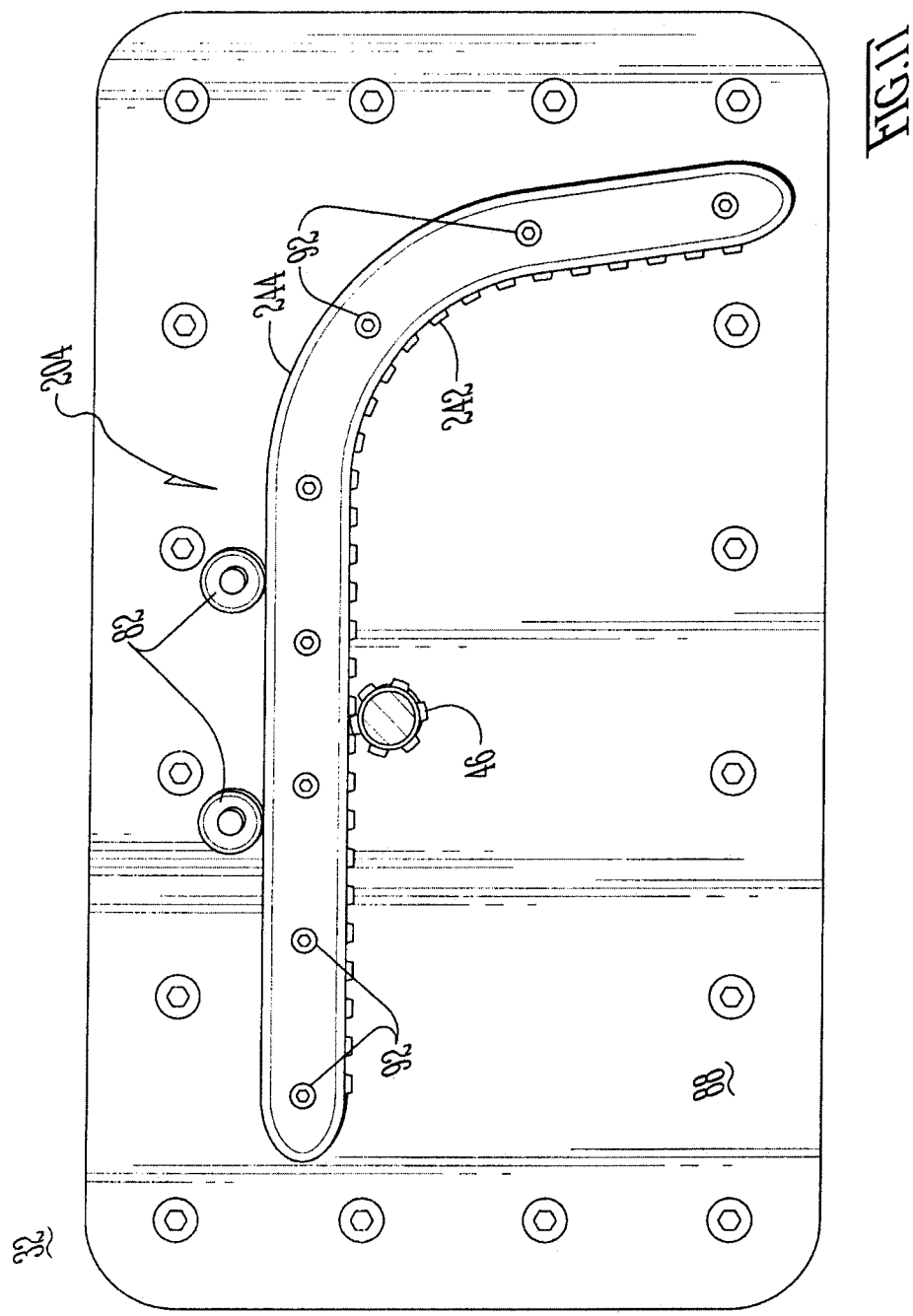

AUTOMATIC OR MECHANIZED FOOD-PROCESS LINES

CROSS-REFERENCE TO PROVISIONAL APPLICATION(S)

This application claims the benefit of U.S. Provisional Application No. 63/186,080, filed May 8, 2022. The foregoing patent disclosure(s) is(are) incorporated herein by this reference thereto.

BACKGROUND AND SUMMARY OF THE INVENTION

The invention generally relates to automatic and/or mechanized food-process line equipment and, more particularly, to racking and alignment provisions for assembling, dis-assembling and then re-assembling the numerous separate machines that are formed up to make an automatic and/or mechanized food-process line. One flexibility of such automatic and/or mechanized food process lines is that one machine can be swapped out for a different machine in order to cause a change in the output food product pieces. For example, a swapped in machine may give a different coating to the food product pieces (eg., breading vs. Panko) or run food product pieces of substantially different character (eg., whole muscle pieces like chicken tenders vs. formed product like hamburger patties).

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1A is a perspective view of a characteristic automatic and/or mechanized food-process line;

FIG. 1B shows fairly much the same subject matter of FIG. 1A except in a block diagram fashion, and taken from a top plan vantage point, wherein the arrows indicate the direction of flow of the food product pieces (not shown) from upline (right) to downline (left);

FIG. 2 is an enlarged-scale perspective view of detail II-II in FIG. 1A and comprises coating apparatus like for example and without limitation as shown by U.S. Pat. No. 9,687,018—Nothum, Jr., et al., "Food process-line coating apparatus with exchangeable substitution or elimination of accessories of the tumbling and/or flipping nature;"

FIG. 3 is a reduced-scale side elevation view of the machine in FIG. 2 except furthermore situated between an immediately upline machine to the right and an immediately downline machine to the left, and in FIG. 3 for the first time the racking and alignment provisions in accordance with the invention are slightly visible, as beneath at least two of the machines;

FIG. 4 is an enlarged-scale top plan view taken in the direction of arrows IV-IV in FIG. 2;

FIG. 5 is an enlarged-scale side elevation view taken in the direction of arrows V-V in FIG. 2;

FIG. 6 split perspective view wherein the bottom half of the view and the top half of the view are different kinds of perspective views, wherein the bottom half of the view is a top perspective view of the track shown in FIG. 4, and, the top half of the view is a bottom perspective view of (eg., looking up at) the bottom wall of the food-process line machine in FIG. 4, showing a slowly-driven gear-toothed router wheel in accordance with the invention mounted on a drive shaft projecting out of the bottom wall of the food-process line machine;

FIG. 7A is a top plan schematic view of FIG. 3, showing a line of three food-process line machines in series, wherein the left and right (downline and upline) machines are racked and aligned in the preferred alignment for them, but the center machine is in the process of making a docking or parking maneuver from approaching from an outside five o'clock position on an imaginary clock dial in FIG. 7A;

FIG. 7B is a top plan schematic view comparable to FIG. 7A except showing the center machine half through a pivot from the outside five o'clock position on the imaginary clock dial (eg., FIG. 7A) to being momentarily during its pivot being lined up on an axis from four o'clock to ten o'clock on the imaginary clock dial;

FIG. 7C is a top plan schematic view comparable to FIG. 7B except showing the center machine racked and aligned in the preferred alignment for it, oriented on a three o'clock to nine o'clock axis, parallel with (or preferably centered on) the longitudinal axis of near symmetry of the automatic and/or mechanized food process line;

FIG. 10 is a top perspective view of FIG. 9, with portions removed from view and other portions shown schematically in broken line, to show better that the cam roller wheels are mounted at the bottom of shafts which have upper ends mounted at the outer ends of spring-biased arms, which pivot about pivot axes through the inner ends of the arms to induce (a) the cam roller wheels to stay engaged with the featureless (smooth) sidewall and (b) the slowly-driven gear-toothed router wheel to stay engaged with the gear-tooth formed sidewall;

alternatively, the pivoting of the arms may be mechanically driven by a drive source as well; and FIG. 11 is a perspective view comparable to FIGS. 6, 8 and 9 and more closely comparable to FIG. 9 except of a fourth embodiment of a track in accordance with invention, comprising a monorail track in contrast to slots or channels shown previously, and an associated slowly-driven gear-toothed router wheel in accordance with the invention furthermore complimented by a pair of cam roller wheels, wherein during parking or docking maneuvers (a) the slowly-driven gear-toothed router wheel to stays engaged with the gear-tooth formed sidewall of the monorail track and (b) the cam roller wheels stay engaged with the featureless (smooth) sidewall of the monorail track.

DETAILED DESCRIPTION OF THE PREFERRED EMBODIMENTS

Figure 8:
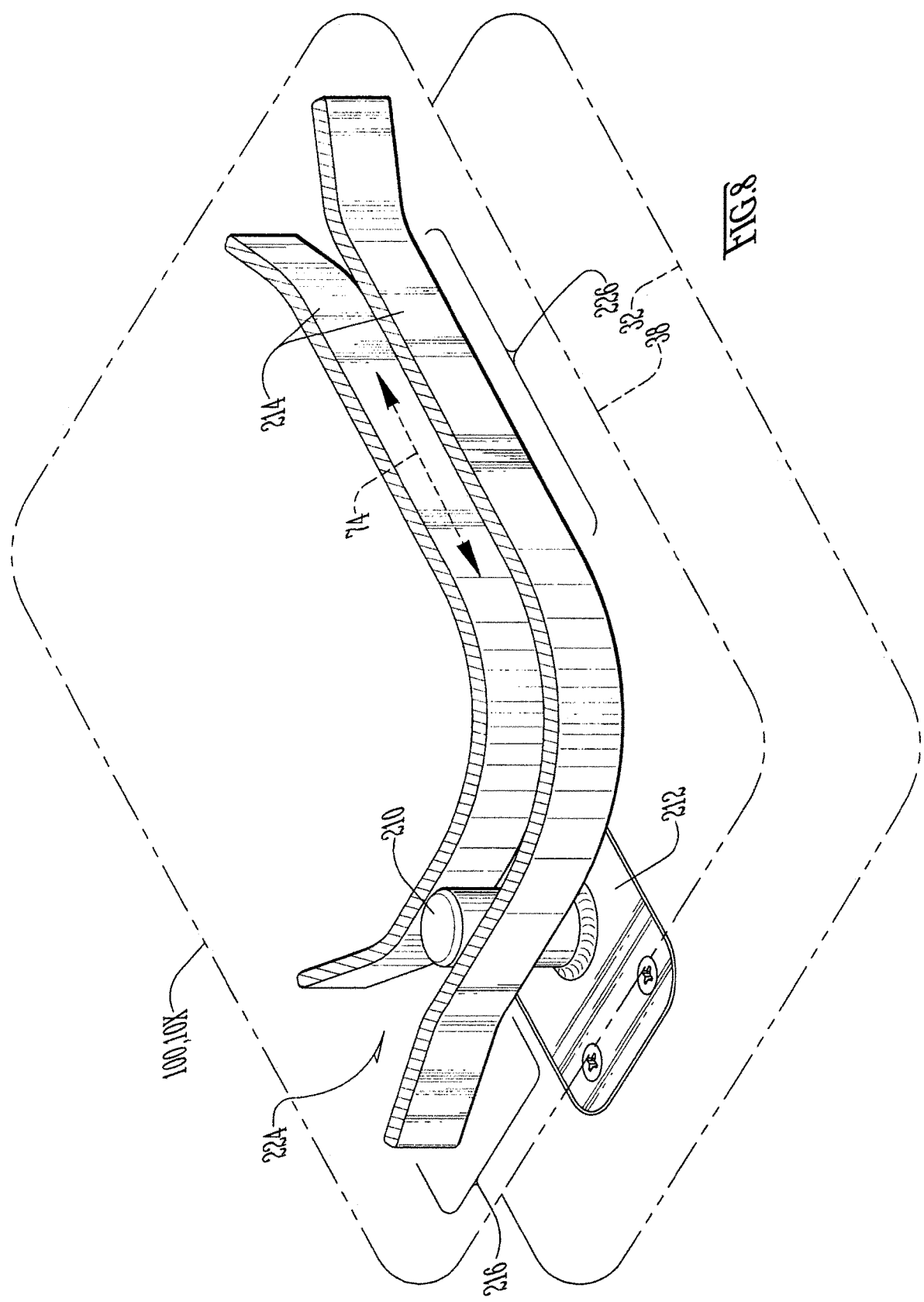
FIG. 8 is a perspective view comparable to FIG. 6 except of a second embodiment of a track in accordance with the invention and an associated router member for cooperating with the track except this router member is fixed (eg., it is a peg or stylus), and moreover it is fixed to the factory floor whereas the track is affixed to the bottom wall of the food-process line machine.

FIG. 1A is a perspective view of a characteristic automatic and/or mechanized food-process line 20 for which the various improvements in accordance with several embodiments of the invention are intended to benefit:—and for several parties including the process line 20 owners and operators, the process line 20 workers and, surprisingly, the consuming public in broadening the array of different kinds and characteristics of food-stuffs which can be outputted by switching around the food-process line 20 quickly from one set-up of machines 100 (including without limitation such specific examples as 10T, 10X, 10D, 10W, 10C, 10Z and 10S described more particularly below) to a re-configured different set-up of machines 100.

FIG. 1B shows fairly much the same subject matter of FIG. 1A except in a block diagram fashion, and taken from a top plan vantage point, wherein the arrows indicate the direction of flow of the food product pieces (not shown) from upline (right) to downline (left). As mentioned before, the automatic and/or mechanized food-process line 20 is assembled from several different machines 100 (or equipment or apparatus), some of which are more typically included in food-process line 20 than others, but all depends on the desired end result.

Starting at the left side of the view, the symbol "PT" might signify a fryer 10T like for example and without limitation as shown by U.S. Pat. No. 6,305,274—Nothum, Sr., et al., entitled "Fryer for food process lines" ("PT" being an abbreviation for applicant's designation ProTherm).

The symbol "PF" in the view might signify a transfer conveyor 10X like for example and without limitation as shown by U.S. Pat. No. 10,329,092—Nothum, Jr., et al., "Pivoting and reversibly expanding-contracting transfer conveyor for food process lines" ("PF" being an abbreviation for applicant's designation PivoFlex).

The symbols "SF" appearing twice in the view might signify a dry coating apparatus 10D like for example and without limitation as shown by U.S. Pat. No. 9,687,018—Nothum, Jr., et al., "Food process-line coating apparatus with exchangeable substitution or elimination of accessories of the tumbling and/or flipping nature" ("SF" being an abbreviation for applicant's designation "SuperFlex").

The symbol "BP" might signify a batter (eg., wet coating) machine 10W like for example and without limitation as shown by U.S. Pat. No. 6,510,810—Nothum, Sr., et al., "Convertible combination batter mixer and applicator machine" ("BP" being an abbreviation for applicant's designation BatterPro).

The symbol "PV" might signify a pre-dusting station 10C like for example and without limitation as shown in U.S. Pat. No. 8,096,259—Nothum, Jr., et al., "Gutters and plows for coating-material recirculation in food-coating apparatus." ("PV" being an abbreviation for applicant's designation Pro VersaCoat).

In FIG. 1B, the furthest T-shaped block on the right might represent one or two machines 100 or operations of any of the following types of machines or operations:

a food-product forming operation (indicated as 10Z in FIG. 1B) like for example and without limitation as shown in U.S. Pat. No. 7,886,657—Nothum, Jr., "Integrated compact food process line and process;"

a particularizing loader like for example and without limitation as shown in U.S. Pat. No. 8,678,886—Nothum, Jr., "Food-product loader for food process lines;" or a bulk loader (eg., hopper) (indicated as 10S in FIG. 1A) like for example and without limitation as shown in U.S. Patent Application Publication No. 2021/0205835—Nothum, Jr., "Work-saving improvements for food-process lines."

It is an aspect of business in this industry that these kinds of automatic and/or mechanized food-process lines 20 have to be assembled and disassembled constantly and frequently, for many reasons including for cleaning (ie., to sanitize or disinfect) the line 20, for maintenance, and then also for re-configuring the line-up of machines 100 or the swapping in and out of other machines 100 to produce a different food product (eg., to substitute in a Panko machine like for example and without limitation as shown in U.S. Pat. No. 9,521,862—Nothum, Jr., "Food product coating apparatus for Panko crumb and the like."

(The foregoing body of patent disclosures are hereby incorporated herein by this reference thereto.)

It is an object of the invention to speed up the disassembly and re-assembly process.

FIG. 2 is a perspective view of a characteristic machine 100 in automatic and/or mechanized food-process lines 20. For sake of example, this machine might be a drum-tumbling crumb coating machine 10D (eg., SF in FIG. 1B). In alternative generic terminology, this form of machine 10D might be referred to as drum-tumbling dry coating machine 10D. This machine 10D, as typical of all the other machines 100 except the fryer 10T (PT in FIG. 1B), rolls on casters 30 across the factory floor 32 (or at least on roller-footed feet 30). The weight of the machine 10D is carried by the casters 30 (or roller feet). In FIG. 1, this food-process line 20 machine 100 line-up would be assembled by originally rolling the transfer conveyor 10X (PV) up to the fryer 10T (PT) and docking it there. The transfer conveyor 10X can be a fairly light machine and perhaps one worker could manage this by themself. But heavier machines like dry coating apparatus 10D "SF" and wet coating apparatus 10W "BP" for sure are plural worker operations. The fryer 10T (PT) doesn't readily move. The fryer 10T (PT) is a much larger, longer and heavier machine, and it has a lot of utilities hooked up to it (eg., thermal oil circulation, perhaps the frying oil supply too). The fryer 10T (PT) is more less a permanent fixture.

So such food process lines 20 have heretofore typically been built from the most immovable machine:—the fryer 10T (PT). The fryer 10T (PT) is for all practical purposes the downline endpoint for food process steps or operations that distinguish the food product pieces. After the fryer 10T (PT) is packaging, freezing, handling and so on.

So the core of the food process line 20 is typically built starting at the end, the fryer 10T (PT), and then progresses from there which is the upline direction.

There is always the risk that with too few of workers to roll these machines 100 around, there is the greater risk that a machine 100 may gain too much momentum and get away from the workers, and perhaps collide into the downline machine 100 it is being parked against, and damage both machines 100.

So the assembly/re-assembly of the line 20 always poses the potential for collision damage. It is an object of the invention to park adjacent machines 100 relative to each other by automated control provisions, or else powered assist provisions, but at least by passive docking and parking guide tracks (eg., reference numeral 201 in FIGS. 3-7, reference numeral 202 in FIG. 8, reference numeral 203 in FIG. 9, reference numeral 204 in FIG. 11).

FIG. 2 shows that this food process machine (eg., a drum-tumbling dry coating machine 10D, or SF in FIG. 1B) comprises a box-like cabinet 34 built on a box-like frame 36, with four caster wheels 30 at each bottom corner of the cabinet 34. FIG. 5 shows that the cabinet 34 includes a bottom wall 38, and that a servo motor 42 mounted inside the cabinet 34 and on this bottom wall 38. The servo motor 42 is mounted vertically and its drive shaft 44 projects down through the bottom wall 38 and carries the slowly-driven gear-toothed router wheel 46 that is suspended off the factory floor 32 by some small gap.

Mounted stationary on the factory floor 32 is a rack track 201 (also referred to as any of channel, slot, guide rail path or pathway and so on). The machine 10D (SF) is manually wheeled until the slowly-driven gear-toothed router wheel 46 engages the gear-toothed sidewall 52 of the track 201. The electric power supplied to the machine 10D for its tumbling operations can also power the servo motor 42. The onboard power and an onboard control system 54 may drive the slowly-driven gear-toothed router wheel 46 and automatically take over the final few centimeters of docking and parking the machine 10D into the preferred position for it.

To return briefly to FIGS. 1A and/or 1B, the machines 100 of the food process line 20 are disassembled from the rear, beginning with the loader(s) 10S and/or forming machines 10Z. Several of the machines 100 have inflow or discharge conveyor noses 56 and 58 that project into the preceding (upline) or succeeding (downline) machine 100. So the machines 100 have to be backed out and/or the respective conveyor noses 56 and 58 raised up or retracted to disassemble the line 20.

FIGS. 4 and 6 show that this track 201 (or channel and so on) is non-linear in part. The left (downline) half 62 of the track 201 is linear and aligned on (or parallel to) the central lineal axis 64 (of near symmetry) of the automatic and/or mechanized food-process line 20 after assembly. FIG. 4, as well as FIGS. 7A through 7B, provide a designation for this central lineal axis 64 (of near symmetry) for the automatic and/or mechanized food-process line 20. To return to FIGS. 4 and 6, the right (upline) half 66 of the track 201 is curved outboard from the lineal axis 64 (down in FIG. 4 and down and right in FIG. 6).

The track 201 comprises a pair of spaced sidewalls 52 and 72, defining a main aisle 74 (channel or slot) equidistantly spaced apart for the most part, except at the opposite open ends 76 and 78 where the sidewalls 52 and 72 flare apart to form a funnel-shaped entrance 76 or 78 for the main aisle 74 of the track 201. One sidewall 52 is formed with teeth which are engaged by the slowly-driven gear-toothed router wheel 46 and hence it is the "rack" (gear-tooth formed) sidewall 52. The other sidewall 72 is preferably featureless (smooth) and serves as a cam surface engaged by the undriven cam roller wheel 82, and for the purpose of forcing the slowly-driven gear-toothed router wheel 46 to remain in engagement with the gear-tooth formed sidewall 52.

In use, the drum-tumbling dry coating machine 10D will be wheeled manually by a team of workers until the slowly-driven gear-toothed router wheel 46 enters the funnel of the outboard-facing funnel entrance 76. After the slowly-driven gear-toothed router wheel 46 is directed into the funnel entrance 76 and reaches the throat 84, the servo motor 42 can be switched ON. As the slowly-driven gear-toothed router wheel 46 gains traction on the rack (gear-toothed formed) sidewall 52, the slowly-driven gear-toothed router wheel 42 provides assistance if not takes over the final centimeters of docking and parking the drum-tumbling dry coating machine 10D relative to a succeeding (downline) machine (which in FIG. 1B could be PF pivoting transfer conveyor 10X or BP the batter coating machine 10W).

The bottom wall 38 of the drum-tumbling dry coating machine 10D further provides the mounting of depending vertical shaft 86 carrying the undriven cam roller wheel 82. This undriven cam roller wheel 82 is mounted to interact with the featureless (smooth) sidewall 72 and, cooperatively with the slowly-driven gear-toothed router wheel 46, true up the axial alignment of the drum-tumbling dry coating machine 10D in the linear portion 62 of the track 201. Again, the alignment is preferably centered on (or parallel to) the central lineal axis 64 (of near symmetry) for the automatic and/or mechanized food-process line 20.

Disassembly can be managed in a variety of ways. FIGS. 5 and 10 show that the slowly-driven gear-toothed router wheel 46 and the undriven cam roller wheel(s) 82 can be manually disengaged from the track 201 (or 203) by pulling them up and out of the slot 201 (or 203). Now the respective machine 100 can roll freely, free of any constraint of the track 201 (or 203).

Alternatively, the slowly-driven gear-toothed router wheel 46 and the undriven cam roller wheel(s) 82 can be left engaged. And with disassembly, the servo-motor 42 would initiate the reversing of machine 10D (SF) away from (or out of) the succeeding (downline) machine 100, providing a straight reverse path to avoid damage to either of the machines 100.

FIG. 7A is a top plan schematic view of a line 20 of three machines 100 in series. The left (downline) machine 100 is racked and aligned in the preferred alignment for it. The right (upline) machine 100 is a little backed away from its preferred final location but at least is aligned centered on (or parallel to) the central lineal axis 64 (of near symmetry) for the automatic and/or mechanized food-process line 20. The center machine 100 is undergoing a distinctly different maneuver. The center machine 100 is in the process of making a docking or parking maneuver from approaching from an outside five o'clock position on an imaginary clock dial in FIG. 7A. Workers would manually roll the machine 100 on its caster wheels to the position shown in FIG. 7A.

FIG. 7B is a top plan schematic view comparable to FIG. 7A except showing the center machine 100 half through a pivot from the outside five o'clock position on the imaginary clock dial (eg., FIG. 7A) to about an alignment on a four o'clock to ten o'clock axis on the imaginary clock dial. The servo motor 42 and slowly-driven gear-toothed router wheel 46 would take over the maneuvering from this stage.

FIG. 7C is a top plan schematic view comparable to FIG. 7B except showing the center machine 100 racked and aligned in the preferred alignment for it. The center machine 100 is oriented on a three o'clock to nine o'clock axis, parallel with (or preferably centered on) the longitudinal axis 64 of near symmetry of the automatic and/or mechanized food process line 20. Again, the servo motor 42 and slowly-driven gear-toothed router wheel 46 would take over the responsibility of maneuvering the center machine 100 from the position shown in FIG. 7B to the position shown in FIG. 7C.

In FIGS. 7A through 7C, it can be appreciated that the linear (straight) section 62 of the track 201 can be made relatively longer or shorter to accommodate machines 100 of different length. Alternatively, the linear section 62 of the track 201 can be extended as necessary by laying new track.

FIG. 7A shows the downline most machine 100 (the left machine) is in its preferred parking spot by observing that the slowly-driven gear-toothed router wheel 46 is in the fore-to-aft middle of the linear section 62 of its respective track 201. However, the upline most machine 100 (the right machine) is not. It can be observed that the undriven cam roller wheel 82 has just barely made the turn of the arcuate section 66 and sits at the rear of the straight section 62.

The reason for this, as shown in FIG. 7B, is it allows the center machine 100 to pivot without swiping either the machine 100 downline from it or the machine 100 upline from it.

In FIG. 7C, the upline most machine 100 (the right machine) has been advanced further in its track 201's straight section 62 to close the gap with the center machine 100. In other words, the straight (linear) sections 62 of the tracks 201 allow a little adjustment of machine position both to provide gaps during pivot maneuvers as well as close the gaps for food process line 20 run times.

To return to FIGS. 5 and 6, this first embodiment of a track 201 in accordance with the invention comprises a pair of spaced sidewalls 52 and 72 standing up off a mounting plate 88 by means of a fence-like row of spaced posts 92. The mounting plate 88 is then positioned on the factory floor 32 at planned locations, certainly with surveying-equipment exactness. The slowly-driven gear-toothed router wheel 46 and the undriven cam roller wheel 82 are mounted at the end of respective shafts 44 and 86 which are respectively mounted to mounting hardware in mounted to the bottom sidewall 38 of the cabinet 34 of the machine 100. The slowly-driven gear-toothed router wheel 46 and the undriven cam roller wheel 82 are mounted so that they have vertical strokes. In FIG. 5, the slowly-driven gear-toothed router wheel 46 and the undriven cam roller wheel 82 as drawn in solid lines are at their vertically downward extreme, which can be reckoned as the "engagement" elevation. But they can be elevated up, so that the elevation the slowly-driven gear-toothed router wheel 46 is shown in broken lines, is the "disengaged" elevation.

FIG. 8 is a perspective view comparable to FIG. 6 except of a second embodiment of a track 202 in accordance with the invention and an associated router member 210 for cooperating with the track 202 (eg., the router member 210's route/transit being guided and constrained by the track 202). However, in this embodiment, the router member 210 is a fixed protrusion standing up off the factory floor 32, and moreover it is just a static protrusion 210 (eg., it is a peg or stylus). It does not spin. Furthermore, as just mentioned, in this embodiment the router structure 210 stands up off the factory floor 32 (rather than being suspended from the bottom wall 38 of any food-process line 20 machine 100). And in a swap of positions, the track 202 is affixed to the bottom wall 38 of the food-process line 20 machine 100 (and does not stand up off the factory floor 32).

This FIG. 8 embodiment of track 202 and router member 210 is an economically suitable accommodation for lighter weight machines (eg., 10X) of any of the assortment of machines 100 that might form an automatic and/or mechanized food-process line 20. In FIG. 1B, machine PF (10X) would be for example and without limitation a transfer conveyor PF (10X).

Before discussing FIG. 8 much further, some preliminaries are due about these kind of food process lines 20 in general.

These food process lines 20 are composed of a string of machines 100 lined up (aligned) in series in an actual "line." Each machine 100 is typically specially designed for a distinct operation or set of operations.

The machines 100 handle food products fit for human consumption including without limitation chicken, fish, seafood, pork, beef and so on (eg., chicken tenders, chicken nuggets, shrimp tails, and on and on and on). These food process lines 20 are loaded with (what typically are) raw food product pieces at an intake end, convey the pieces through a series of coating operations, then further convey the coated food product pieces through a hot oil bath fryer 10T which more or less par-fries the food product pieces sufficient to set the coatings. The food product pieces are then frozen, packaged and shipped to remote destinations. Before human consumption, the frozen food product pieces will be cooked to a final specified condition (eg., deep-fried, or thawed and baked, and so on) to complete the food product for consumption.

In these food process lines 20, most if not all of these machines 100 will have endless conveyor belts (eg., portions indicated as nose end 56 and 58) receiving the food product pieces at an intake end 56 for that machine 100, and discharging the food product pieces from 'that' machine 100 to a downline machine 100. Thus the dividing partition between each machine 100 in the line 20 is typified by a transfer operation. In FIG. 1B, some machines 100 both perform a coating operation and transfer the food product pieces directly to a succeeding downline coating machine 100. In other places, two machines will be separated by a transfer conveyor PF (10X) which does the job. The transfer conveyor 10X might combine other functions like weighing functions, flowrate adjustment operations, compensate for elevational differences and more.

For the majority of the machines 100, the internal conveying functions are handled by stainless wire mesh endless belts typified by an upper food-product carrying run and a lower return run. In fewer cases (eg., a coating machine that handles Panko crumb), the endless belt of the main conveyor through the Panko coating machine comprises a web of solid material, and preferably the solid web material comprises food grade conveyor belt reinforced with KEVLAR® cord.

For the purposes of the present invention, machines 100 in these kinds of food process lines 20 can be broadly classed into three categories (again, these categories are not any industry standard, they are just categories based broadly on weight, complexity of function and immovability):
A. the fryer 10T;
B. transfer conveyors 10X, side cars, other lightweight adjuncts; and
C. everything in between.

The term "side car" is by no means not any term of art, but here merely gives a name to the many special-function side adjuncts that many of the machines are accompanied by. These side carts are wheeled separately about on their own casters 30 (or roller feet). A dry coating machine 10D will have a side car comprising a hopper of make-up dry coating material (ie., to replenish the dry coating machine 10D after so much dry coating material has been carried away by the intake of uncoated food product and discharge of dry-coated food product). Similarly for a batter machine 10W, it will have a side car comprising a hopper of dry batter mix (which will be mixed with water inside the batter machine 10W to make the wet coating). Perhaps other side cars are to collect debris, like with the hot oil bath fryer 10T which may produce fried hard pieces of coating material alone with no meat in the core. There is a continuous production of both floating debris and sinking debris in the fryer 10T. That debris is skimmed or collected and transferred out the frying oil bath and transferred over to a collection bin, for ultimate disposal later. That collection bin for that debris is such a side car.

All these machines 100 reside in a factory (eg., a food process line 20 production plant). The factory has a factory floor 32 typically comprising a concrete slab coated in any of numerous USDA-approved floor coatings. The floor 32 is generally flat but there will be a distribution of other features like floor drains or drain channels, and perhaps some local shallow slope proximate the floor drains or drain channels.

Utilities like for example and without limitation electric power, water, thermal oil service for the fryer, or alternatively combustible fuel for the fryer, will typically brought in from overhead or at least over the ground plane of the floor 32.

It is in this environment that such food process lines 20 are formed, run, and then disassembled for cleaning, maintenance, reassembled/re-configured and run again. So again to return the three broad classes of machines:

A. The Hot Oil Bath Fryer 10T.

The improvements in accordance with the invention are not readily expected to benefit hot oil bath fryers 10T. Hot oil bath fryers 10T are long, heavy, plumbed with a lot of utility connections. Hot oil bath fryers 10T are not usually (not ever?) mounted on casters or roller feet 30. During use, the hot oil bath fryer 10T will have a full bath of hot frying oil. During cleaning, that will be drained, but the hot oil bath fryer 10T will typically also have a full fluid circuit of a circulating thermal fluid. Frying oil these days is predominately any of a number of vegetable-based cooking oils, most which can be found in a home kitchen (whereas fat or lard and the like have long fallen out of disfavor). Thermal oil is more akin to engine oil. It is not suitable for human consumption.

During cleaning, the thermal oil will not be drained. The thermal oil circuit itself and its connections are typically hardwalled steel channels or pipe. The hot oil bath fryer 10T has two endless conveyor belts extending nearly its entire length, one over the other. The upper endless conveyor is a submerger conveyor belt. The hot oil bath fryer 10T has a hood not just to contain fumes but to provide a barrier and safety to workers. The hot oil bath fryer 10T moreover has a full cabinet which when closed again provides a barrier and safety to workers from hot components, as well as provides some insulation. In part the insulation helps contain thermal loss and thus perhaps makes the hot oil bath fryer more efficient. In other part, the insulation reduces thermal pollution in the indoor factory environment for the comfort of workers as well as not to spoil food or coating material products also sharing the same the indoor factory environment ("room") as the hot oil bath fryer 10T.

In sum, the hot oil bath fryer 10T is so different because it is so big, heavy, complex and immobile that is more or less the fixed head of the line 20 on the factory floor 32 from which the more mobile machines 100 are formed in a line 20 as a tail.

B. The Transfer Conveyor 10X.

The transfer conveyor 10X (PF in FIG. 1B) sits at the opposite end of the spectrum of weight and mobility. The transfer conveyor 10X can be wheeled around with ease perhaps by only one worker. The transfer conveyor 10X lacks a cabinet (since such is essentially needless) and is more or less a bare legged cart, rolling on casters 30.

The second embodiment of a track 202 and associated router member 210 in accordance with the invention, and as shown by FIG. 8, is a good match for a transfer conveyor 10X. The router member 210 here is fixed (eg., it is a peg or stylus), and moreover it is fixed relative to the factory floor 32. The router member 210 (peg or stylus) is fixed directly to a mounting plate 212 and the mounting plate 212 is fixed directly to the factory floor 32. Whereas FIG. 8 shows mounting plate 212 fastened to the factory floor 32 by fasteners into the concrete slab, alternatively and preferably the mounting plate 212 is affixed by adhesive. The track 202 is affixed to some low elevation structure of the transfer conveyor 10X (or bottom wall 38 of a food-process line 20 machine 100 that has a cabinet 34). The track 202 comprises a pair of arcuate featureless (smooth) sidewalls 214 evenly spaced apart from one another to make pathway 74 for guiding the router member 210. The track 202's sidewalls 214 form a funnel section 216 and an entrant section 224 for the process of making a docking or parking maneuver from approaching from an outside five o'clock position on an imaginary clock dial like shown in FIG. 7A. The track 202's sidewalls 214 form a linear section 226 racked for aligning the associated machine 100 (eg., transfer conveyor 10X) in the preferred alignment for it, oriented on a three o'clock to nine o'clock axis of the imaginary clock dial of FIGS. 7A-7C, parallel with (or preferably centered on) the longitudinal axis 64 of near symmetry of the automatic and/or mechanized food process line 20 like shown in FIG. 7C.

C. Every Other Kind of Machine Between A. And B.

To go back to making general comments about these kind of food process lines 20, the machines 100 in this residuary Class C. are characterized by being too heavy for one worker to handle alone. These residuary Class C. are characterized by having cabinets 34. The cabinets 34 partition the machine 100 into at least two interior spaces. There is typically an upper through-flow channel through which food product pieces flow from the intake end 56 to the discharge end 58. Along the way, the food product pieces are subjected to some operation or pick up some form of coating. A non-coating operation may be for example and without limitation an operation searing in grill marks on beef patties or the like.

But if the operation is a coating operation, part of the function of the cabinet 34 is to confine the wafting or slinging about of the coating material inside the upper flow-through channel. Hoods are included to further assist in confining the wafting or slinging about of the coating material inside the upper flow-through channel. The rest of the cabinet 34 comprises perhaps a lower utility space for a motor 42 or motors, gears or transmissions that preferably closes tight enough to combat intrusion of the debris in the form of its own coating material, or the coating material of companion machines. Wheat flour, among other coating materials, can quickly gum up an electric motor or the meshing effectiveness of a pair of gears. The cabinet 34 further partitions the cabinet housing as a whole into various smaller or pocket-sized spaced as for control systems 54 and other electronics.

Figure 9:
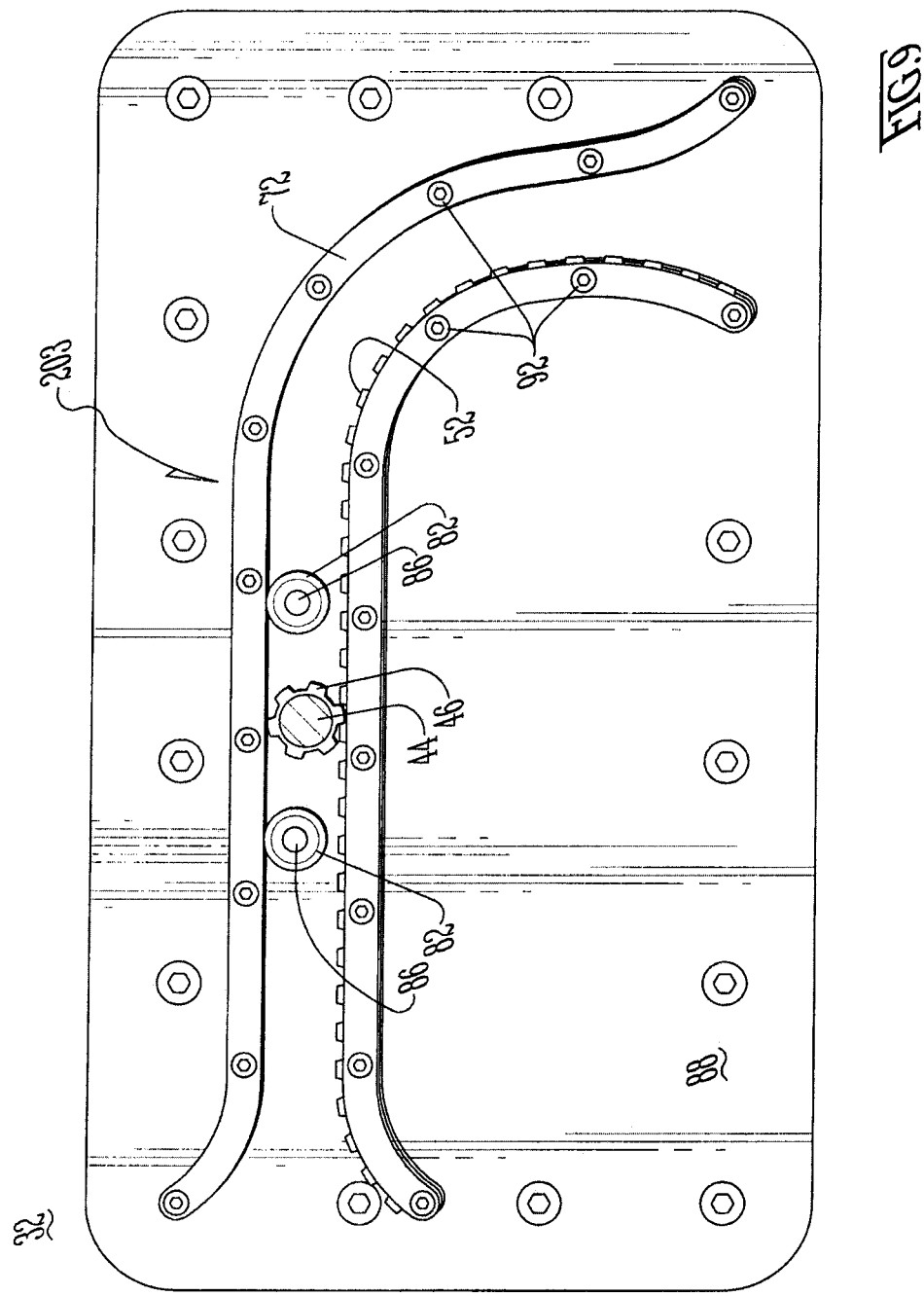
FIG. 9 is a perspective view comparable to FIGS. 6 and 8 except of a third embodiment of a track in accordance with invention and an associated slowly-driven gear-toothed router wheel in accordance with the invention, which is furthermore complimented by (flanked between) a pair of cam roller wheels, wherein during parking or docking maneuvers the slowly-driven gear-toothed router would engage the toothed sidewall of the track and the cam roller wheels would engage the featureless (smooth) sidewall of the track.

FIG. 9 shows of a third embodiment of a track 203 in accordance with invention and an associated slowly-driven gear-toothed router wheel 46 in accordance with the invention, which is furthermore complimented by (flanked between) a pair of cam roller wheels 82. During parking or docking maneuvers the slowly-driven gear-toothed router 46 would engage the toothed sidewall 52 of the track 203 and the cam roller wheels 82 would engage the featureless (smooth) sidewall of the track 72. FIG. 10 is a top perspective view of FIG. 9 to show better that the cam roller wheels 82 are mounted at the bottom of shafts 86 which have upper ends mounted at the outer ends of spring-biased arms 232. The arms 232 pivot about pivot axes through the inner ends of the arms 232 to induce (a) the cam roller wheels 82 to stay engaged with the featureless (smooth) sidewall 72 and (b) the slowly-driven gear-toothed router wheel 46 to stay engaged with the gear-tooth formed sidewall 52.

The cam roller wheels 82 are spaced flanking the slowly-driven gear-toothed router wheel 46, wherein one cam roller wheel 82 leads and the other cam roller wheel 82 trails. The slowly-driven gear-toothed router wheel 46 and dual cam rollers wheels 82 make three points of contact with the track 203. This three point contact better trues up the alignment of the associated machine 100 for orientation on a three o'clock to nine o'clock axis of the imaginary clock dial of FIGS. 7A-7C, parallel with (or preferably centered on) the longitudinal axis 64 of near symmetry of the automatic and/or mechanized food process line 20 like shown in FIG. 7C.

Alternatively, the pivoting of the arms 232 may be mechanically driven by a drive source as well. The drive sources could be independent servo-motors. The purpose of driving the arms 232 is not to propel the associated machine 100 with forward or rearward movement with respect to the track 203. Rather, the arms 232 are driven so that the arms 232 will yield better to the machine 100 making the turn in the track 203 (eg., like in FIG. 7B) but then rigidly force the machine 100 to orient parallel with the process line 20 axis 64 as shown in FIG. 7C.

FIG. 11 shows of a fourth embodiment of a track 204 in accordance with invention, comprising a monorail track 204 in contrast to slots or channels shown previously, and an associated slowly-driven gear-toothed router wheel 46 in accordance with the invention furthermore complimented by a pair of cam roller wheels 82. As described comparably before, during parking or docking maneuvers (a) the slowly-driven gear-toothed router wheel 46 to stays engaged with the gear-tooth formed sidewall 242 of the monorail track 204 and (b) the cam roller wheels 82 stay engaged with the featureless (smooth) sidewall 244 of the monorail track 204.

And further as comparably described before, the cam roller wheels 82 are spaced wherein one cam roller wheel 82 is relatively ahead of the slowly-driven gear-toothed router wheel 46 in the fore to aft direction and the other cam roller wheel 82 is relatively trailing the slowly-driven gear-toothed router wheel 46 in the fore to aft direction. That way, the slowly-driven gear-toothed router wheel 42 and dual cam rollers wheels 82 make three points of contact with the monorail track 204. This three point contact better trues up the alignment of the associated machine 100 for orientation on a three o'clock to nine o'clock axis of the imaginary clock dial of FIGS. 7A-7C, parallel with (or preferably centered on) the longitudinal axis 64 of near symmetry of the automatic and/or mechanized food process line 20 like shown in FIG. 7C.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. An improvement for automatic or mechanized food-process lines comprising numerous separate machines that are formed up to make an automatic or mechanized food-process line for food process production in a the food process factory having a factory floor; said improvement being in racking and alignment provisions for assembling, dis-assembling and then re-assembling the numerous separate machines that are formed up to make the automatic or mechanized food-process line for food process production in the food process factory;

said racking and alignment provisions being adapted for at least one food process line machine that wheels about on casters or roller feet, whereby to guide the at least one food process line machine into a preferred alignment during assembling and re-assembling the line; and comprising any of:

a transfer conveyor;

a dry coating machine;

a wet coating machine;

coating machines of other natures including Panko crumb coating machines;

machines performing non-coating, cosmetic operations;

said improvement comprising:

said at least one food process line machine having a low elevation mounting structure spaced above the factory floor by a low gap;

a track attached to or affixed relative to either the low elevation mounting structure of the at least one food process machine or the factory floor, but not the other; and a router provision attached to or affixed relative to the other of the low elevation mounting structure or the factory floor for being guided by the track.

2. The improvement of claim 1, wherein:

the track comprises one rail that has one sidewall formed with gear teeth; and the router provision comprises a slowly-driven gear-toothed router wheel for engaging the gear-formed sidewall of the rail.

3. The improvement of claim 2, wherein:

the track further comprises a spaced other rail; and the improvement further comprises a cam roller wheel mounted cooperatively with the slowly-driven gear-toothed router wheel wherein the cam roller wheel and slowly-driven gear-toothed router wheel mutually induce each other such that the cam roller wheel stays engaged with the other rail and the slowly-driven gear-toothed router wheel to stay engaged with the gear-tooth formed sidewall of the one rail.

4. The improvement of claim 2, wherein:

a rail further comprises a second sidewall such that the rail has a thickness between the one sidewall formed with gear teeth and the second sidewall; and the improvement further comprises a cam roller wheel mounted cooperatively with the slowly-driven gear-toothed router wheel wherein the cam roller wheel and slowly-driven gear-toothed router wheel mutually induce each other such that the cam roller wheel stays engaged with the second sidewall and the slowly-driven gear-toothed router wheel stays engaged with the gear-tooth formed sidewall.

5. The improvement of claim 4, further comprising:

a second cam roller wheel mounted cooperatively with the slowly-driven gear-toothed router wheel and one cam roller wheel wherein the one and second cam roller wheels and slowly-driven gear-toothed router wheel mutually induce each other such that the one and second cam roller wheels stay engaged with the second sidewall and the slowly-driven gear-toothed router wheel stays engaged with the gear-tooth formed sidewall.

6. The improvement of claim 5, wherein:
the food process line defines a lineal axis extending from an upline direction to a downline direction, or vice versa;
the rail has a lineal section which during food process line run operations is aligned with or parallel the lineal axis of the food process line; and
the router wheel is flanked between the one and second cam rollers in the upline to downline direction, or vice versa.

7. The improvement of claim 6, wherein:
the rail is elongated between a relatively upline entry end and a spaced relatively downline other end;
the rail further comprising an arcuate section that curves outboard from the lineal section and terminates in the entry end whereby food process line machines make a side entry inbound trip to assembly and alignment by virtue of the arcuate section and then the lineal section, or else, side disassembly outbound trip by virtue of the lineal section and then the arcuate section.

8. The improvement of claim 7, wherein:
the track is attached to or affixed relative to the factory floor; and
the router is provision attached to or affixed relative to the low elevation mounting structure of the at least one food process machine.

9. The improvement of claim 7, further comprising:
a second track attached to or affixed relative to either the low elevation mounting structure of a second food process machine or the factory floor, but not the other; and
a second router provision attached to or affixed relative to the other of the low elevation mounting structure of the second food process line machine or the factory floor for being guided by the second track.

10. The improvement of claim 3, further comprising:
a second cam roller wheel mounted cooperatively with the slowly-driven gear-toothed router wheel and one cam roller wheel wherein the one and second cam roller wheels and slowly-driven gear-toothed router wheel mutually induce each other such that the one and second cam roller wheels stay engaged with the spaced other rail and the slowly-driven gear-toothed router wheel stays engaged with the gear-tooth formed sidewall of the one rail,
whereby the spaced rails define an aisle therebetween.

11. The improvement of claim 10, wherein:
the food process line defines a lineal axis extending from an upline direction to a downline direction, or vice versa;
the aisle has a lineal section which during food process line run operations is aligned with or parallel the lineal axis of the food process line; and
the router wheel is flanked between the one and second cam rollers in the upline to downline direction, or vice versa, when all are occupying the lineal section of the aisle.

12. The improvement of claim 11, wherein:
the aisle is elongated between a relatively upline entry end and a spaced relatively downline other end;
the aisle further comprising an arcuate section that curves outboard from the lineal section and terminates in the entry end whereby food process line machines make a side entry inbound trip to assembly and alignment by virtue of the arcuate section and then the lineal section, or else, side disassembly outbound trip by virtue of the lineal section and then the arcuate section.

13. The improvement of claim 12, wherein:
the track is attached to or affixed relative to the factory floor; and
the router provision is attached to or affixed relative to the low elevation mounting structure of the at least one food process machine.

14. The improvement of claim 12, further comprising:
a second track attached to or affixed relative to either the low elevation mounting structure of a second food process machine or the factory floor, but not the other; and
a second router provision attached to or affixed relative to the other of the low elevation mounting structure of the second food process line machine or the factory floor for being guided by the second track.

15. The improvement of claim 12, wherein:
the spaced rails proximate the entry end of the aisle flare away to form a funnel shaped throat at the entry end.

16. The improvement of claim 12, wherein:
the router provision is mounted stationary relative to either the low elevation mounting structure of the food process line machine or the factory floor;
the one and second cam rollers are mounted on respective arms that mounted to either the low elevation mounting structure of the food process line machine or the factory floor mutually with the router provision;
the arms are furthermore mounted to yield the respective one or second cam roller during the turn in the arcuate section whereby thereafter true up the alignment and assembly of the food process line machine in the lineal section of the aisle.

17. The improvement of claim 1, further comprising:
a second track attached to or affixed relative to either the low elevation mounting structure of a second food process machine or the factory floor, but not the other; and
a second router provision attached to or affixed relative to the other of the low elevation mounting structure of the second food process line machine or the factory floor for being guided by the second track.

18. The improvement of claim 1, further comprising:
a plurality of tracks attached to or affixed relative to either the low elevation mounting structure of a plurality of food process machines or the factory floor; and
a plurality of router provisions attached to or affixed relative to the other of the low elevation mounting structure of respective ones of the plurality of food process line machines or the factory floor for being guided by the respective track therefor.

19. The improvement of claim 18, wherein:
the tracks are attached to or affixed relative to the factory floor at spaced locations relative to the lineal axis of the food process line; and
the router provisions are attached to or affixed relative to the low elevation mounting structure of the respective one food process machine.

20. The improvement of claim 19, wherein:
the tracks comprises at least one rail that has one sidewall formed with gear teeth;
the respective router provisions each comprises a slowly-driven gear-toothed router wheel for engaging the gear-formed sidewall of the respective guide rail; and
each respective food process line machine further comprises a servo motor whereby for driving the respective slowly-driven gear-toothed router wheel.

* * * * *